United States Patent
Lee (10) Patent No.: US 10,425,921 B2
(45) Date of Patent: Sep. 24, 2019

(54) METHOD OF UPLINK CONTROL INFORMATION TRANSMISSION

(71) Applicant: ACER INCORPORATED, New Taipei (TW)

(72) Inventor: Chien-Min Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 15/081,959

(22) Filed: Mar. 28, 2016

(65) Prior Publication Data

US 2016/0295573 A1  Oct. 6, 2016

Related U.S. Application Data

(60) Provisional application No. 62/141,279, filed on Apr. 1, 2015.

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/0026* (2013.01); *H04L 1/0028* (2013.01);
(Continued)

(58) Field of Classification Search
CPC ......... H04W 72/0413; H04W 72/0446; H04W 72/04; H04W 72/1284; H04L 5/001;
(Continued)

(56) References Cited

U.S. PATENT DOCUMENTS

2011/0243066 A1\* 10/2011 Nayeb Nazar .......... H04L 1/007
370/328
2012/0039252 A1\* 2/2012 Damnjanovic ....... H04L 1/0026
370/328
(Continued)

FOREIGN PATENT DOCUMENTS

CN 101615984 A 12/2009
CN 102959890 A 3/2013
(Continued)

OTHER PUBLICATIONS

NTT Docomo, Inc., Necessary enhancements to enable LTE CA of up to 32CCs for DL and UL, 3GPP TSG RAN WG1 Meeting #80, Feb. 9-13, 2015, pp. 1/3-4/3, R1-150593, XP050933801, Athens, Greece.
(Continued)

Primary Examiner — Will W Lin
(74) Attorney, Agent, or Firm — Winston Hsu (57) ABSTRACT

A method of uplink control information (UCI) transmission for a user equipment in a communication system includes determining information associated with a first maximum payload size configured for a first physical uplink control channel (PUCCH) format; and transmitting a first channel status information (CSI) subset on a first PUCCH with the first PUCCH format to the network node. The first CSI subset corresponds to the first group of serving cells, and the first PUCCH is associated with a first group of serving cells. The first maximum payload size is configurable.

28 Claims, 5 Drawing Sheets

(51) Int. Cl.
*H04L 1/00* (2006.01)
*H04L 5/00* (2006.01)
(52) U.S. Cl.
CPC ............ *H04L 1/1812* (2013.01); *H04L 5/001* (2013.01); *H04L 5/0057* (2013.01)
(58) Field of Classification Search
CPC ... H04L 1/0026; H04L 1/1671; H04L 5/0057; H04L 1/0028; H04L 1/1812
USPC .......................................................... 370/329
See application file for complete search history.

(56) References Cited

U.S. PATENT DOCUMENTS

| | | | | |
|---|---|---|---|---|
| 2012/0120817 | A1* | 5/2012 | Khoshnevis | H04L 1/0026 370/252 |
| 2012/0140649 | A1* | 6/2012 | Choudhury | H04W 24/10 370/252 |
| 2013/0021980 | A1* | 1/2013 | Yang | H04B 7/0626 370/328 |
| 2013/0121270 | A1* | 5/2013 | Chen | H04L 5/001 370/329 |
| 2013/0258874 | A1* | 10/2013 | Khoshnevis | H04L 5/0057 370/252 |
| 2013/0315185 | A1* | 11/2013 | Kim | H04W 24/10 370/329 |
| 2013/0329691 | A1* | 12/2013 | Kim | H04L 5/001 370/329 |
| 2014/0036704 | A1* | 2/2014 | Han | H04W 28/12 370/252 |
| 2015/0215928 | A1* | 7/2015 | Davydov | H04L 5/0053 370/329 |
| 2015/0237521 | A1* | 8/2015 | Davydov | H04W 24/10 370/329 |
| 2015/0365831 | A1* | 12/2015 | Ko | H04L 5/001 370/329 |
| 2016/0183244 | A1* | 6/2016 | Papasakellariou | H04L 5/001 370/329 |
| 2016/0211903 | A1* | 7/2016 | Damnjanovic | H04B 7/0626 |
| 2016/0278073 | A1* | 9/2016 | Dinan | H04W 48/08 |
| 2017/0012753 | A1* | 1/2017 | Kim | H04W 76/14 |
| 2017/0111898 | A1* | 4/2017 | Han | H04W 4/70 |
| 2017/0208585 | A1* | 7/2017 | Han | H04L 1/1657 |
| 2017/0366323 | A1* | 12/2017 | Ahn | H04L 5/00 |
| 2018/0006791 | A1* | 1/2018 | Marinier | H04L 1/0026 |

FOREIGN PATENT DOCUMENTS

| | | |
|---|---|---|
| CN | 103270714 A | 8/2013 |
| CN | 103581918 A | 2/2014 |
| EP | 2 882 242 A2 | 6/2015 |
| TW | 201424428 A | 6/2014 |
| WO | 2013178187 A2 | 12/2013 |

OTHER PUBLICATIONS

Sharp, UL channel dropping and conversion for UCI transmissions in dual connectivity, 3GPP TSG RAN WG1 Meeting #78bis, Oct. 6-10, 2014, pp. 1-5, R1-143942, XP050869610, Ljubljana, Slovenia.

Huawei, Hisilicon, On CA enhancements supporting up to 32 component carriers, 3GPP TSG RAN WG1 Meeting #80, Feb. 9-13, 2015, R1-150390, XP050933600, Athens, Greece.

3GPP TS 36.213 V12.5.0 (Mar. 2015), Technical Specification, 3rd Generation Partnership project; Technical Specification Group Radio Access Network; Evolved Universal Terrestrial Radio Access (E-UTRA); Physical layer procedures, release 12, pp. 1-2 & 165-176, XP055542160.

* cited by examiner

METHOD OF UPLINK CONTROL INFORMATION TRANSMISSION

CROSS REFERENCE TO RELATED APPLICATIONS

This application claims the benefit of U.S. provisional application No. 62/141,279 filed on 2015 Apr. 1, included herein by reference in its entirety.

BACKGROUND OF THE INVENTION

1. Field of the Invention

The present invention relates to a method used in a communication system, and more particularly, to a method of uplink control information (UCI) transmission in a communication system.

2. Description of the Prior Art

The 3rd Generation Partnership Project (3GPP) has initiated the Long Term Evolution (LTE) program to bring novel network architecture and configuration, novel technology, and novel applications and services to provide reduced latency, improved spectral efficiency and faster user experiences with less cost. An LTE-advanced (LTE-A) system, as its name implies, is an evolution of the LTE system. The LTE-A system targets faster switching between power states, improves performance at the coverage edge of a base station, and includes advanced techniques, such as carrier aggregation (CA), coordinated multipoint (CoMP) transmission/reception, uplink (UL) multiple-input multiple-output (MIMO), etc.

CA is a mechanism to increase bandwidth of a wireless communication system. This feature allows scalable expansion of effective bandwidth delivered to a user terminal through concurrent utilization of radio resources across multiple serving cells or component carriers (CCs). A communication device or user equipment (UE) with reception and/or transmission capabilities for CA may simultaneously receive and/or transmit on multiple CCs corresponding to multiple serving cells. To support the future growth of mobile traffic data, 3GPP has approved to extend CA up to 32 CCs in Rel-13 standard. Nevertheless, the extension of the CA framework beyond 5 CCs would bring serious challenges as all the CA aspects do not scale as the number of aggregated CCs increases.

For example, extending downlink CA for up to 32 DL CCs increases the amount of uplink control information (UCI) transmitted on a physical uplink control channel (PUCCH) from a UE to a base station significantly. The UCI primarily includes channel status information (CSI) and hybrid automatic repeat request acknowledgment (HARQ-ACK). Besides, there is only one single PUCCH on an uplink CC (i.e., a primary CC). The UCI corresponding to all downlink CCs can only be transmitted on the uplink CC irrespective of the number of downlink CCs according to current specifications. In legacy technology, only one CSI report can be transmitted over the PUCCH. If more than one CSI reports are scheduled to be transmitted via the same uplink CC, a considerably large payload would need to be support. The payload size of the PUCCH is however fixed and limited—even the latest PUCCH format 3 can merely have a 22-bit payload size to the maximum.

In addition, if the UE is scheduled to transmit at least one CSI report over a PUCCH on an uplink CC (e.g., the primary CC) and at least one CSI report over another PUCCH on another uplink CC (e.g., a secondary CC), there is a trade-off between uplink coverage and CSI transmission because the uplink transmission power of a communication device is also limited. Basically, physical random access channel (PRACH) power is first prioritized, and remaining power may be used by the PUCCHs. When the UE does not have enough power, power is then scaled down on the PUCCHs, which could lead to dramatic drop in signal-to-noise ratio (SNR).

Therefore, an improved method of reporting UCI over a pre-configured uplink resource (e.g., PUCCH) is required particularly when a UE is configured with a large number of serving cells.

SUMMARY OF THE INVENTION

The present invention therefore provides a method for reporting UCI even if the number of aggregated CCs grows.

An embodiment of the present invention discloses a method of uplink control information (UCI) transmission for a user equipment in a communication system, the method comprising determining information associated with a first maximum payload size configured for a first physical uplink control channel (PUCCH) format, wherein the first maximum payload size is configurable; and transmitting a first channel status information (CSI) subset on a first PUCCH with the first PUCCH format to the network node, wherein the first CSI subset corresponds to the first group of serving cells, and the first PUCCH is associated with a first group of serving cells.

Another embodiment of the present invention discloses a communication device comprising a storage unit, configured to store a program code; and a processing unit, configured to execute the program code, wherein a method of uplink control information (UCI) transmission compiled into the program code comprises determining information associated with a first maximum payload size configured for a first physical uplink control channel (PUCCH) format, wherein the first maximum payload size is configurable; and transmitting a first channel status information (CSI) subset on a first PUCCH with the first PUCCH format to the network node, wherein the first CSI subset corresponds to the first group of serving cells, and the first PUCCH is associated with a first group of serving cells.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
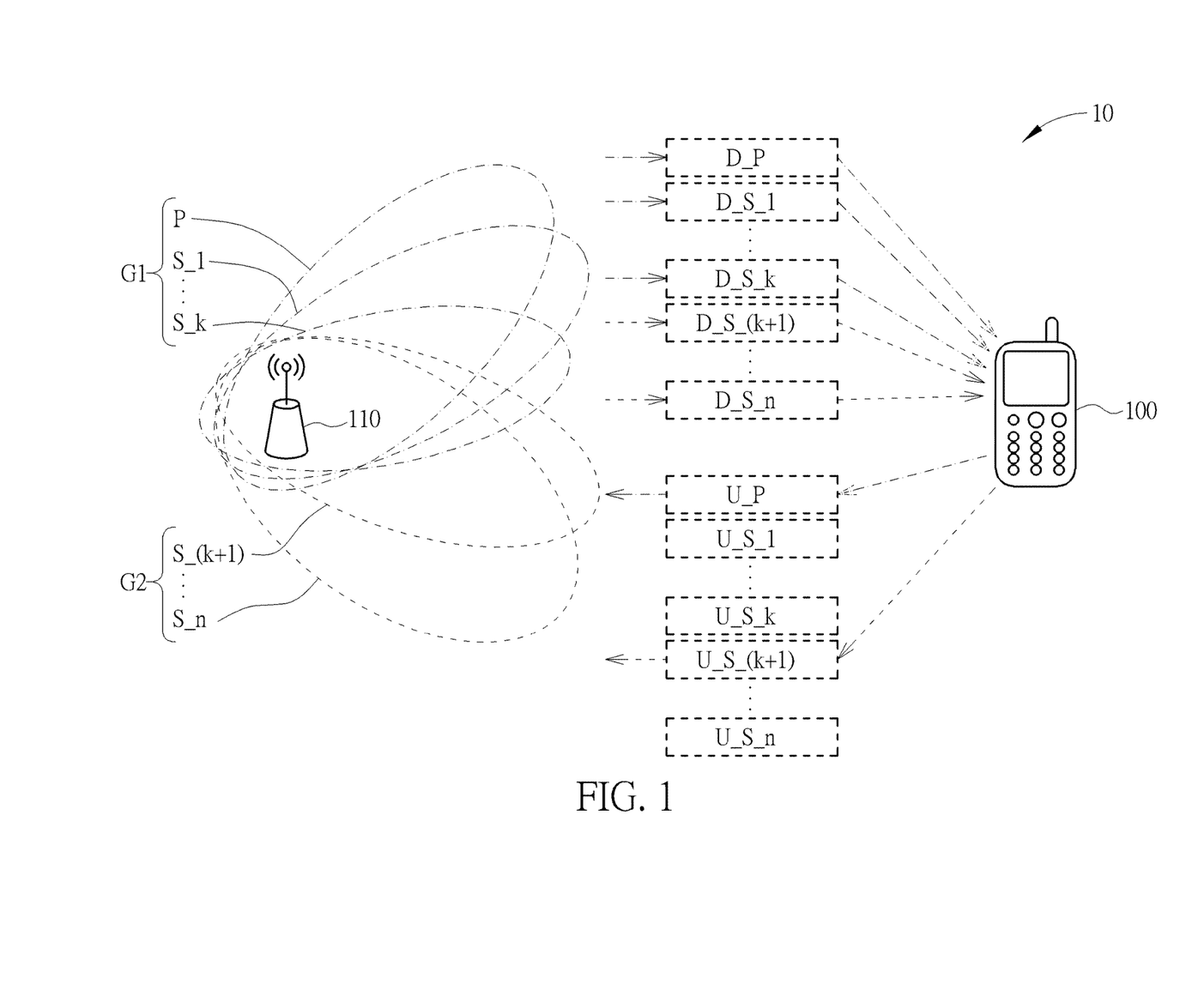
FIG. 1 is a schematic diagram illustrating a communication system according to an example of the present invention.

FIG. 1 is a schematic diagram illustrating a communication system 10 according to an example of the present invention. The communication system 10 is a cellular communication system, which briefly includes a network node and a communication device 100. It is worth noting that the network node and/or the communication device 100 in FIG. 1 are simply utilized for illustrating the structure of the communication system 10. Besides, the communication system 10 shown in FIG. 1 is a frequency division duplexing (FDD) system; however, the present invention is not limited thereto—for example, the communication system may be a time division duplexing (TDD) system, such that the throughput is shared between the downlink and the uplink. The network node may include a base station 110, a controller (not shown), a server (not shown), and a database (not shown). As carrier aggregation is used, the base station 110 may provide services with serving cells P and S_1 to S_n, but it is also feasible if the serving cells P and S_1 to S_n are served by the base station 110 in addition to some other base stations together. Basically, a radio Resource Control (RRC) connection is only handled by a primary serving cell (i.e., the serving cell P), which is served by an uplink component carrier U_P and a downlink component carrier D_P. The other serving cells S_1 to S_n are secondary serving cells served by uplink component carriers U_S_1 to U_S_n and downlink component carriers D S_1 to D S_n respectively. The secondary serving cells S_1 to S_n are added and/or removed as required, while the primary serving cell P is changed only at handover. The serving cells P and S_1 to S_n may be separated into different groups by the network node, for example, according to a RRC (radio resource control) signal. For example, serving cells P and S_1 to S_k constitute a first group G1; serving cells S_(k+1) to S_n constitute a second group G2. Here, k and n may be any arbitrary positive integers, and n could be larger than k. The communication device 100 configured with serving cells P and S_1 to S_n reports uplink control information (UCI), which may at least includes channel status information (CSI) and/or hybrid automatic repeat request (HARQ) acknowledgment and/or scheduling request (SR), over a pre-configured uplink resource such as physical uplink control channel (PUCCH) to the base station 110. For example, the primary serving cell P is equipped with one PUCCH (i.e., a first PUCCH) sent on the uplink component carrier U_P; the secondary serving cell S_(k+1) is equipped with one PUCCH (i.e., a second PUCCH) sent on the uplink component carrier U_S_(k+1). Accordingly, the base station 110 receives a first CSI subset corresponding to a part or all of the serving cells P and S_1 to S_k of the first group G1 over the first PUCCH, and/or receives a second CSI subset corresponding to a part or all of the serving cells S_(k+1) to S_n of the second group G2 over the second PUCCH.

In short, multiple CSI reports are transmitted on a first PUCCH with a first PUCCH format and/or a second PUCCH with a second PUCCH format to the base station 110. The first PUCCH and the second PUCCH are associated with the serving cells P and S_1 to S_k of the first group G1 and the serving cells S_(k+1) to S_n of the second group G2 respectively. Moreover, to support different maximum payload sizes for different groups having serving cells of different numbers, the first PUCCH format, which may be the same as or different from the second PUCCH format, may be a PUCCH format X with a configurable maximum payload size.

Specifically, for the base station 110 configured with more than one serving cells P and S_1 to S_n, different PUCCH resources could be allocated to transmit UCI for different groups of the serving cells P and S_1 to S_n (i.e., the first group G1 and the second group G2). Different PUCCH formats such as PUCCH format 2, 2a, 2b and 3, which are specified in Long Term Evolution (LTE) release 10, could be configured for different groups by the base station 110, respectively. For example, a number of serving cells P and S_1 to S_k in the first group G1 is different from a number of serving cells S_(k+1) to S_n in the second group G2; accordingly, transmission of UCI on the first PUCCH uses the first PUCCH format (e.g., PUCCH format 2b with a maximum payload size up to 13 bits), while the second PUCCH format (e.g., PUCCH format 3 with a maximum payload size up to 22 bits) is configured for the second PUCCH. However, the present invention is not limited to this, and the first PUCCH format may be the same as the second PUCCH format.

Additionally, the current PUCCH format 3 is limited to 22 bits payload. For a balance optimal for the extension of the CA framework, a new PUCCH format X with a configurable maximum payload size is required. The PUCCH format X may be defined as PUCCH format 4, PUCCH format 5, PUCCH format Y or other PUCCH formats for further LTE releases. Here, X and Y may be any arbitrary positive integers larger than 3. In this way, different maximum payload sizes could be configured for different groups by the base station 110, respectively. For example, transmission of UCI on the first PUCCH uses the PUCCH format X supporting a first maximum payload size, while the PUCCH format X having a second maximum payload size different from first maximum payload size is configured for the second PUCCH. Namely, the first maximum payload size corresponding to the PUCCH format X is configurable, and the second maximum payload size corresponding to the PUCCH format X is also configurable. Alternatively, the communication device 100 transmits UCI on the first PUCCH with the PUCCH format X and the second PUCCH with another new PUCCH format Y having a third maximum payload size or with legacy PUCCH format such as PUCCH formats 2, 2a, 2b and 3. It is worth noting that different PUCCH formats may support different multiplexing schemes among different user equipments or may have different coding schemes or coding rules; moreover, different sequences may be utilized to constitute different PUCCH formats.

Besides, the base station 110 belongs to a radio access network. In an embodiment, the radio access network may be a universal terrestrial radio access network (UTRAN) in a universal mobile telecommunications system (UMTS), and the base station 110 corresponds to a Node-B (NB). In another example, the radio access network may be an evolved UTRAN (E-UTRAN) in a long term evolution (LTE) system, a LTE-Advanced (LTE-A) system or an evolution of the LTE-A system; the base station 110 corresponds to an evolved NB (eNB). In another example, the radio access network may be a radio access network conforming to wireless standards such as IEEE 802.11 and IEEE 802.16. Furthermore, the controller, the server, and the database constitute a core network, and the core network may further include network entities such as a Mobility Management Entity (MME), a Serving Gateway (S-GW), a Packet Data Network (PDN) Gateway (P-GW), a Self-Organizing Networks (SON) server and/or a Radio Network Controller (RNC). In other words, after the network node receives information transmitted by the communication device 100, the information may be processed only by the radio access network and decisions corresponding to the information are made at the radio access network. Alternatively, the radio access network may forward the information to the core network, and the decisions corresponding to the information are made at the core network after the core network processes the information. Besides, the information may be processed by both the radio access network and the core network, and the decisions are made after coordination and/or cooperation are performed by the radio access network and the core network. The communication device 100 may be a user equipment (UE), a machine type communication (MTC) device, a mobile phone, a laptop, a tablet computer, an electronic book or a portable computer system, respectively. Besides, the network node and the communication device 100 may be regarded as a transmitter or a receiver according to transmission, for example, for an uplink, the communication device 100 is the transmitter and the network node is the receiver, and for a downlink, the network node is the transmitter and the communication device 100 is the receiver.

Figure 2:
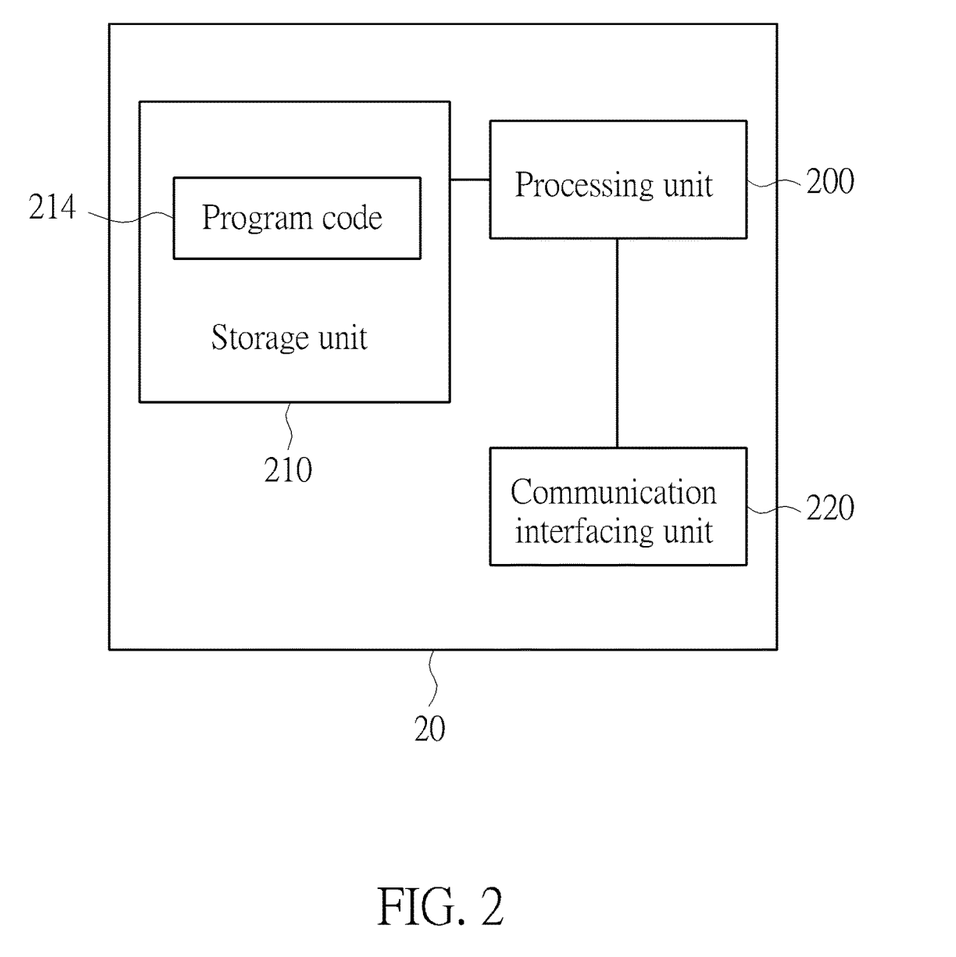
FIG. 2 is a schematic diagram illustrating a device according to an example of the present invention.

FIG. 2 is a schematic diagram illustrating a device 20 according to an example of the present invention. The device 20 may serve as the communication device 100 or the base station 110 (or the network node) shown in FIG. 1, but is not limited herein. The device 20 may include a processing unit 200 such as a microprocessor or an Application Specific Integrated Circuit (ASIC), a storage unit 210 and a communication interface unit 220. The communication interface unit 220 is preferably a transceiver and is used to transmit and receive signals (for example, messages or packets) according to processing results of the processing unit 200. The processing unit 200, the storage unit 210 and the communication interface unit 220 may be formed from circuits respectively. Examples of the storage unit 210 include but are not limited to a subscriber identity module (SIM), a read-only memory (ROM), a flash memory, a random-access memory (RAM), a CD-ROM/DVD-ROM, a magnetic tape, a hard disk and an optical data storage device. Namely, the storage unit 210 may be any data storage device that stores a program code 214, accessed and executed by the processing unit 200. A process for UCI transmission for the communication device 100 may be compiled into the program code 214 and includes the following steps:

Step S102: Start.

Step S104: Determine information associated with the first maximum payload size configured for the first PUCCH format.

Step S106: Transmit the first CSI subset on the first PUCCH with the first PUCCH format to the network node, wherein the first CSI subset corresponds to the first group G1 of serving cells (i.e., the serving cells P and S_1 to S_k), and the first PUCCH is associated with the first group G1 of serving cells.

Step S108: End.

Figure 3:
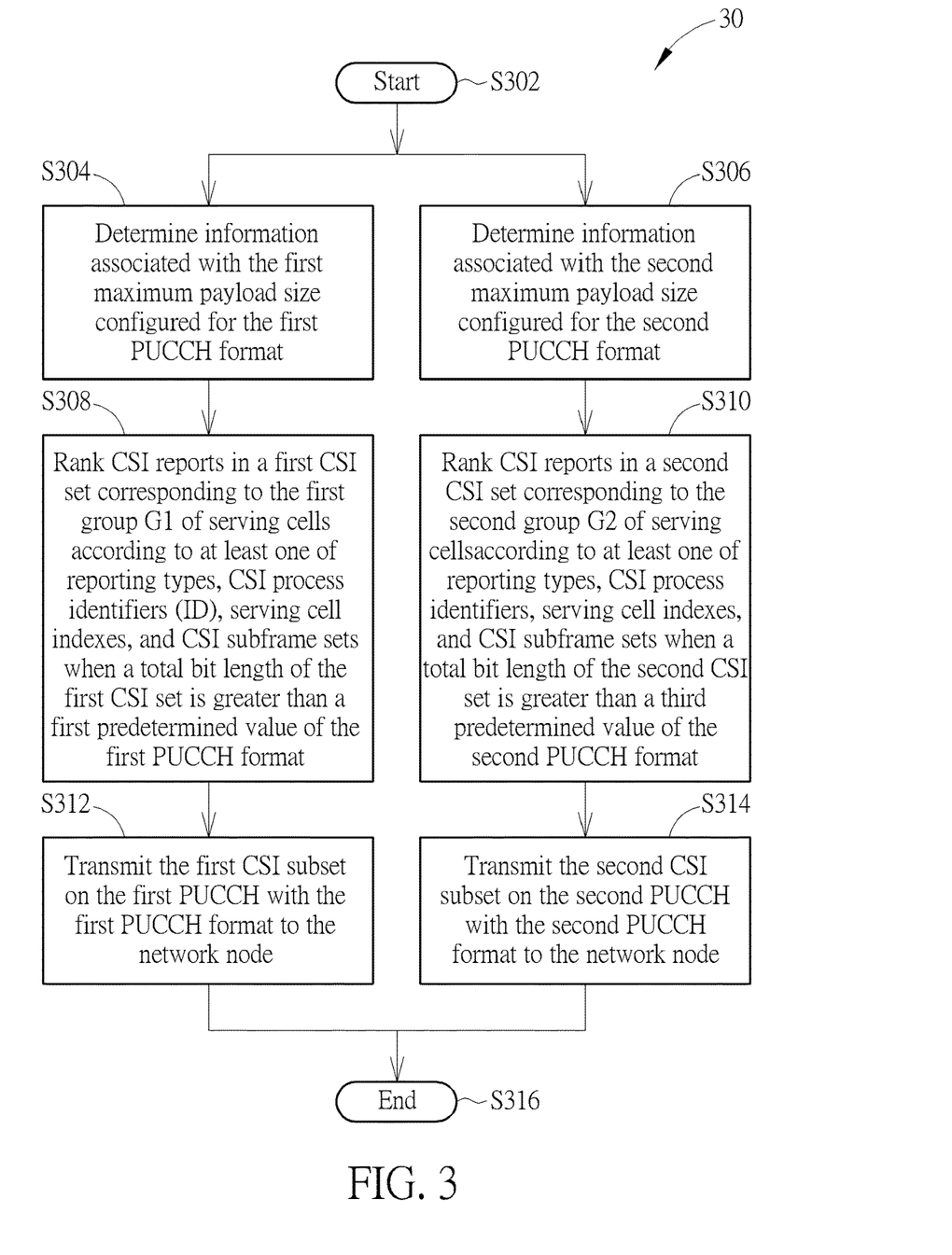
FIG. 3 is a flowchart illustrating a process according to an embodiment of the present invention.

Specifically, FIG. 3 is a flowchart illustrating a process 30 according to an embodiment of the present invention. The process 30 may be utilized in the communication device 100 shown in FIG. 1 to transmit UCI. The process 30 may be compiled into the program code 214 of the communication device 100 and includes the following steps:

Step S302: Start.

Step S304: Determine information associated with the first maximum payload size configured for the first PUCCH format.

Step S306: Determine information associated with the second maximum payload size configured for the second PUCCH format.

Step S308: Rank CSI reports in a first CSI set corresponding to the first group G1 of serving cells (i.e., the serving cells P and S_1 to S_k) according to at least one of reporting types, CSI process identifiers (ID), serving cell indexes, and CSI subframe sets when a total bit length of the first CSI set is greater than a first predetermined value of the first PUCCH format, wherein the first CSI set comprises the first CSI subset to be transmitted at a time instant and a third CSI subset to be dropped, and priorities of CSI reports in the third CSI subset are lower than priorities of the CSI reports in the first CSI subset.

Step S310: Rank CSI reports in a second CSI set corresponding to the second group G2 of serving cells (i.e., the serving cells S_(k+1) to S_n) according to at least one of reporting types, CSI process identifiers (ID), serving cell indexes, and CSI subframe sets when a total bit length of the second CSI set is greater than a third predetermined value of the second PUCCH format, wherein the second CSI set comprises the second CSI subset to be transmitted at a time instant and a fourth CSI subset to be dropped, and priorities of CSI reports in the fourth CSI subset are lower than priorities of the CSI reports in the second CSI subset.

Step S312: Transmit the first CSI subset on the first PUCCH with the first PUCCH format to the network node, wherein the first PUCCH is associated with the first group G1 of serving cells (i.e., the serving cells P and S_1 to S_k), and the first CSI subset corresponds to a part or all of the first group G1 of serving cells.

Step S314: Transmit the second CSI subset on the second PUCCH with the second PUCCH format to the network node, wherein the second PUCCH is associated with the second group G2 of serving cells (i.e., the serving cells S_(k+1) to S_n), and the second CSI subset corresponds to a part or all of a second group G2 of serving cells.

Step S316: End.

In steps S304 and S306, the communication device 100 may determine information associated with the first maximum payload size of the first PUCCH format and the second maximum payload size of the second PUCCH format. The information associated with the first maximum payload size or the second maximum payload size may be received by the communication device 100 from the network node such as the base station 110, after the network node determines and configures the first PUCCH format, the corresponding first maximum payload size, the second PUCCH format and the corresponding second maximum payload size. Nevertheless, it is not necessary for the communication device 100 to receive information associated with maximum payload sizes of the legacy PUCCH formats 2, 2a, 2b and 3 since the maximum payload sizes are fixed and known. Besides, the information associated with the first maximum payload size or the second maximum payload size may be the exact maximum payload size, which is the maximum payload size allowable for UCI transmission, or the maximum code rate but not limited thereto. The first and second PUCCH formats may be selected from the legacy PUCCH formats 2, 2a, 2b and 3 or the PUCCH format X (e.g., X may equal 4, 5 or 6 but not limited thereto) respectively. In steps S308 and S310, both the CSI reports in the first CSI set and the CSI reports in the second CSI set are utilized to inform the network node of the channel conditions that the communication device 100 experiences in the downlink. Moreover, the combination of channel quality indicator (CQI), precoding matrix indicator (PMI) and rank indication (RI) are referred to as CSI reports.

In step S308, the communication device 100 may prioritize the CSI reports in the first CSI set corresponding to a part or all of the serving cells P and S_1 to S_k in the first group G1 when the total bit length of the first CSI set is greater than the first predetermined value of the first PUCCH format. The priorities of the CSI reports in the third CSI subset of the first CSI set may be ranked to be lower than the priorities of the CSI reports in the first CSI set of the first CSI set. Therefore, merely the CSI reports in the first CSI subset, which is contained inside the first CSI set, are transmitted over the first PUCCH to the base station 110 in step S312 at a time instant while the CSI reports in the third CSI subset are dropped. In such a situation, the first PUCCH is associated with the serving cells P and S_1 to S_k in the first group G1; the relationship between the first PUCCH and the serving cells P and S_1 to S_k is configured by the network node such as the base station 110. Likewise, the communication device 100 may prioritize the CSI reports in the second CSI set corresponding to a part or all of the serving cells S_(k+1) to S_n in the second group G2 in step S310 when the total bit length of the second CSI set is greater than the third predetermined value of the second PUCCH format. The priorities of the CSI reports in the fourth CSI subset of the second CSI set may be ranked to be lower than the priorities of the CSI reports in the second CSI set of the second CSI set. Therefore, according to step S314 merely the CSI reports in the second CSI subset are transmitted over the second PUCCH to the base station 110 at a time instant while the CSI reports in the fourth CSI subset are dropped. The second PUCCH is associated with the serving cells S_(k+1) to S_n in the second group G2; the relationship between the second PUCCH and the serving cells S_(k+1) to S_n is configured by the network node such as the base station 110. This is because CSI reporting is carried by limited resources.

Figure 4:
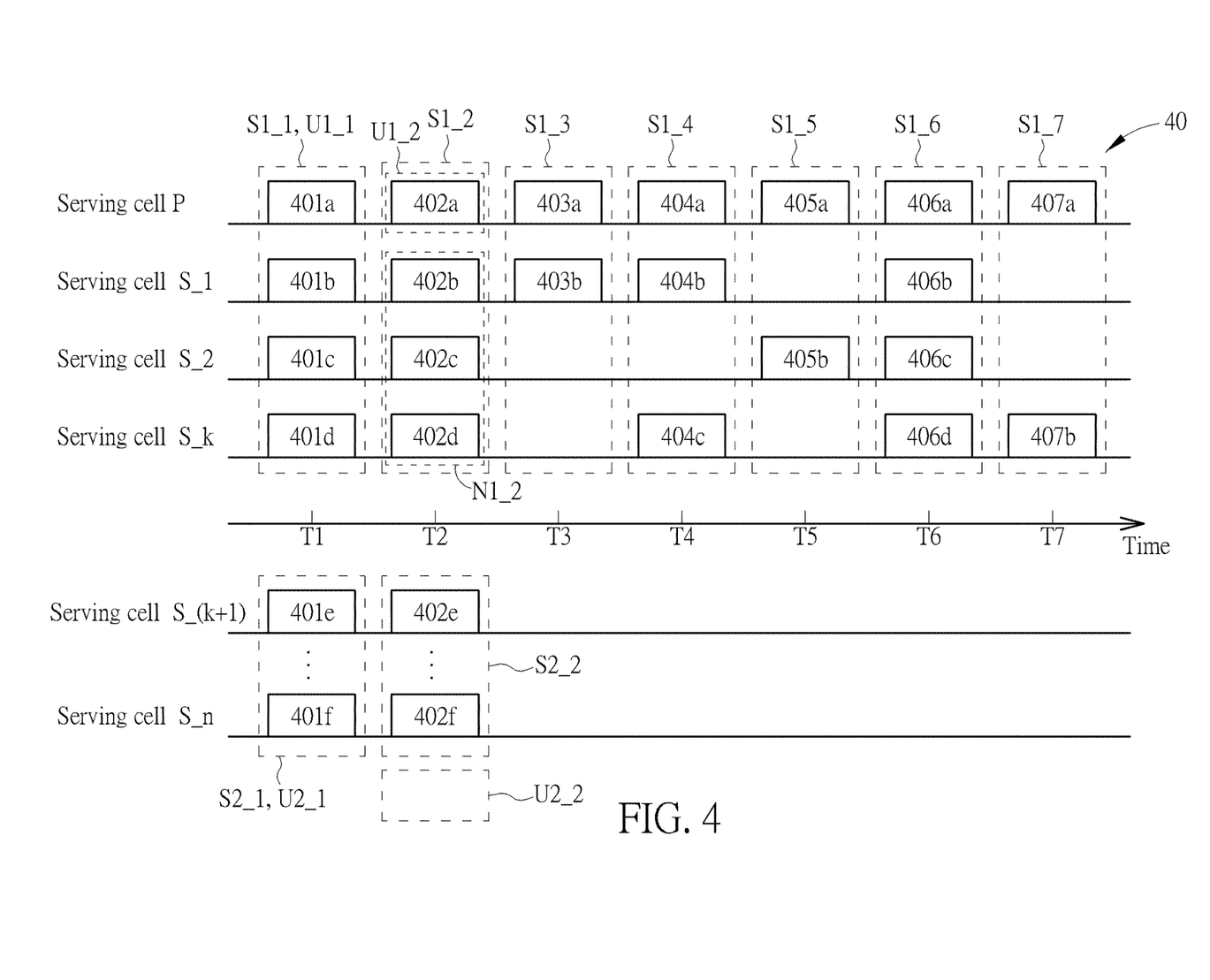
FIG. 4 is a time diagram illustrating a periodic CSI reporting process according to an example of the present invention.

CSI reporting from the communication device 100 to the base station 110 may be periodic. Periodic CSI reporting is normally configured by the base station 110, such that the communication device 100 reports CSI reports to the base station 110 at predetermined instants. FIG. 4 is a time diagram illustrating a periodic CSI reporting process 40 according to an example of the present invention. In FIG. 4, only six serving cells P, S_1, S_2, S_k, S_(k+1) and S_n are shown, whereas this may be applied to more serving cells in a straightforward manner. Besides, a number of CSI reports in the first CSI subset or the second CSI subset would not be larger than a predetermined number configured by the network node such as the base station 110. At a time instant T1, the serving cells P, S_1, S_2 and S_k of the first group G1 may have CSI reports 401a to 401d scheduled to constitute the first CSI set S1_1; the serving cells S_(k+1) and S_n of the second group G2 may have CSI reports 401e and 401f scheduled to constitute the second CSI set S2_1. After prioritization in steps S308 and S310, the communication device 100 may transmit the first CSI subset U1_1 including the CSI reports 401a to 401d over the first PUCCH and may transmit the second CSI subset U2_1 including the CSI reports 401e and 401f over the second PUCCH in steps S312 and S314 if the predetermined number equals to 6. That is to say, the communication device 100 transmits all the CSI reports 401a to 401f to make the first CSI set S1_1 equal to the first CSI subset U1_1 and to make the second CSI set S2_1 equal to the second CSI subset U2_1. Moreover, a number of CSI reports 401a to 401d in the first CSI subset U1_1 may be larger than 1; a number of CSI reports 401e and 401f in the second CSI subset U2_1 may be larger than 1 as well. Similarly, at a time instant T2, the serving cells P, S_1, S_2 and S_k of the first group G1 may have CSI reports 402a to 402d scheduled to constitute the first CSI set S1_2; the serving cells S_(k+1) and S_n of the second group G2 may have CSI reports 402e and 402f scheduled to constitute the second CSI set S2_2. Furthermore, the predetermined number is set to 1. Thus, collisions may be detected between the CSI reports 402a, 402b, 402c and 402d and between the CSI reports 402e and 402f. In such a situation, the communication device 100 merely transmits the first CSI subset U1_2, which merely includes the CSI report 402a over the first PUCCH, whereas the CSI reports 402b to 402d in the third CSI subset N1_2 are dropped. In addition, if the predetermined number is set to 0, the second CSI subset U2_2 would be an empty set because all CSI reports 402e and 402f in the second CSI set S2_2 are dropped. It is worth noting that at the time instant T1 or T2 there is only one CSI report (e.g., the CSI report 402a) corresponding to one serving cell (e.g., the serving cell P); however, the present invention is not limited thereto, and there may be more than one CSI reports corresponding to one serving cell.

Specifically, the CSI reports in the first CSI set corresponding to the first group G1 are ranked in step S308 according to legacy rules specified in LTE release 12, for example, reporting types, CSI process ID, serving cell indexes, and/or CSI subframe sets $C_{CSI,0}$, $C_{CSI,1}$. Similarly, the CSI reports in second CSI set corresponding to the second group G2 are ranked in step S310 according to the legacy rules specified in LTE release 12. For example, a CSI report with reporting type 3, 5, 6 or 2a has higher priority than a CSI report with reporting type 2, 2b, 2c, or 4; a CSI report with reporting type 2, 2b, 2c, or 4 has higher priority than a CSI report with reporting type 1 or 1a. Moreover, a CSI report corresponding to smaller serving cell index has higher priority. If CSI reports corresponding to different serving cells have the same priority according to reporting type, the CSI report for the serving cell having the lowest serving cell index is selected to be transmitted. Furthermore, a CSI report corresponding to the CSI subframe set $C_{CSI,1}$ has the lowest priority whether or not CSI subframe sets are configured for the serving cells. And whether a CSI report is transmitted or dropped may depend on its priority. A CSI report with a lower priority is dropped in advance of another CSI report with a higher priority. For example, at a time instant T3, the serving cells P and S_1 may have CSI reports 403a and 403b scheduled to constitute the first CSI set S1_3. When the total bit length of the first CSI set S1_3 is greater than the first predetermined value of the first PUCCH format, the communication device 100 may rank the priority of the CSI reports 403a and 403b in step S308. If the reporting type of the CSI report 403b (which provides, for example, subband CQI and thus have reporting type 1) is different from the reporting type of the CSI report 403a (which provides, for example, RI feedback and thus have reporting type 3), the priority of the CSI report 403a is ranked to be higher than the priority of the CSI reports 403b according to their reporting types in step S308. And in step S312 the communication device 100 may transmit the CSI report 403a but drop the CSI report 403b. If the reporting type of the CSI report 403a (which provides, for example, RI feedback) is the same as the reporting type of the CSI reports 403b (which provides, for example, RI feedback as well), the priority of the CSI report 403a is still ranked to be higher than the priority of the CSI reports 403b in step S308 because the serving cell index corresponding to the CSI report 403a equals 0 and is smaller than the serving cell index corresponding to the CSI report 403b, which equals 1. And in step S312 the communication device 100 may transmit the CSI report 403a but drop the CSI report 403b.

As the number of CSI reports grows, the communication device 100 may be scheduled by the network node such as the base station 110 to transmit CSI reports in each uplink subframe in a similar way. Alternatively, whether a CSI report is transmitted or dropped may depend on its priority as well as a total bit length of CSI reports scheduled to be transmitted (e.g., the total bit length of the first CSI set). For example, the serving cells P, S_1 and S_k may have CSI reports 404a to 404c scheduled to constitute the first CSI set S1_4 at a time instant T4. In step S308, when the total bit length of the first CSI set S1_4 is greater than the first predetermined value of the first PUCCH format, the communication device 100 may rank the priority of the CSI report 404a (which provides, for example, RI feedback and thus have reporting type 3) higher than the priority of the CSI report 404b (which provides, for example, wideband CQI and PMI and thus have reporting type 3), and rank the priority of the CSI report 404b higher than the priority of the CSI report 404c (which provides, for example, subband CQI and thus have reporting type 1) according to their reporting types. Accordingly, the CSI report 404c is dropped in advance of the CSI report 404b, and the CSI report 404b is dropped in advance of the CSI report 404a. The communication device 100 checks whether a number of the CSI reports 404a to 404c in the first CSI set S1_4 is larger than the predetermined number; the communication device 100 also compares the total bit length of the first CSI set S1_4, which includes the CSI reports 404a to 404c, with a first predetermined value. This first predetermined value may be the maximum payload size allowable for UCI transmission, i.e., the first maximum payload size. Similarly, the third predetermined value may also be the maximum payload size allowable for UCI transmission, i.e., the second maximum payload size.

Take the predetermined number set to 3 as an example. If a total bit length of the CSI reports 404a to 404c is not greater than the first predetermined value, the CSI reports 404a to 404c constitute the first CSI subset. The third CSI subset would be an empty set. In step S312, the communication device 100 transmits the CSI reports 404a to 404c. If a total bit length of the CSI reports 404a and 404b is not greater than the first predetermined value, and if a total bit length of the CSI reports 404a to 404c is greater than the first predetermined value, the CSI reports 404a and 404b constitute the first CSI subset, and the CSI report 404c constitutes the third CSI subset. Therefore, in step S312 the communication device 100 transmits the CSI reports 404a and 404b but drop the CSI report 404c. If a total bit length of the CSI report 404a is not greater than the first predetermined value, and if a total bit length of the CSI reports 404a and 404b is greater than the first predetermined value, the CSI report 404a constitutes the first CSI subset, and the CSI reports 404b and 404c constitute the third CSI subset. Because the priority of the CSI report 404b is higher than the priority of the CSI report 404c, the CSI report 404b has the highest priority in the third CSI subset and may be referred to as a third CSI report. In step S312, the communication device 100 transmits the CSI reports 404a but drop the CSI report 404b and 404c. In another example, if the predetermined number is set to 2, the number of CSI reports 404a to 404c in the first CSI subset S1_4 is larger than the predetermined number. Since the priority of the CSI report 404c is lower than the priorities of the CSI reports 404a and 404b, the communication device 100 merely compares the total bit length of the CSI reports 404a and 404b with the first predetermined value. If the total bit length of the CSI reports 404a and 404b is not greater than the first predetermined value, the communication device 100 transmits the first CSI subset including the CSI reports 404a and 404b to the base station 110 in step S312. If the total bit length of the CSI report 404a is not greater than the first predetermined value, and if the total bit length of the CSI reports 404a and 404b is greater than the first predetermined value, the communication device 100 drops the CSI reports 404b and transmits the first CSI subset merely including the CSI reports 404a to the base station 110.

In addition, a first HARQ acknowledgment (or a second HARQ acknowledgment) with positive-acknowledgment and/or negative-acknowledgment bits is also transmitted on the first PUCCH (or the second PUCCH) to the network node, and the number of HARQ acknowledgment bits may increase significantly according to the growing number of serving cells. Therefore, a process, which may be utilized in the communication device 100 shown in FIG. 1 to transmit UCI, may be compiled into the program code 214 of the communication device 100 and includes the following steps:

Step S402: Start.

Step S404: Determine information associated with the first maximum payload size configured for the first PUCCH format.

Step S406: Determine information associated with the second maximum payload size configured for the second PUCCH format.

Step S408: Rank CSI reports in the first CSI set corresponding to the first group G1 of serving cells (i.e., the serving cells P and S_1 to S_k) according to at least one of reporting types, CSI process identifiers (ID), serving cell indexes, and CSI subframe sets when a total bit length of the first CSI set and the first HARQ acknowledgement is greater than the first maximum payload size of the first PUCCH format, wherein the first CSI set comprises the first CSI subset to be transmitted at a time instant and the third CSI subset to be dropped, and priorities of CSI reports in the third CSI subset are lower than priorities of the CSI reports in the first CSI subset.

Step S410: Rank CSI reports in the second CSI set corresponding to the second group G2 of serving cells (i.e., the serving cells S_(k+1) to S_n) according to at least one of reporting types, CSI process identifiers (ID), serving cell indexes, and CSI subframe sets when a total bit length of the second CSI set and the second HARQ acknowledgement is greater than the second maximum payload size of the second PUCCH format, wherein the second CSI set comprises the second CSI subset to be transmitted at a time instant and the fourth CSI subset to be dropped, and priorities of CSI reports in the fourth CSI subset are lower than priorities of the CSI reports in the second CSI subset.

Step S412: Transmit a first HARQ acknowledgment and the first CSI subset on the first PUCCH with the first PUCCH format to the network node, wherein the first PUCCH is associated with the first group G1 of serving cells (i.e., the serving cells P and S_1 to S_k), and the first CSI subset corresponds to a part or all of the first group G1 of serving cells.

Step S414: Transmit a second HARQ acknowledgment and the second CSI subset on the second PUCCH with the second PUCCH format to the network node, wherein the second PUCCH is associated with the second group G2 of serving cells (i.e., the serving cells S_(k+1) to S_n), and the second CSI subset corresponds to a part or all of a second group G2 of serving cells.

Step S416: End.

Figure 5:
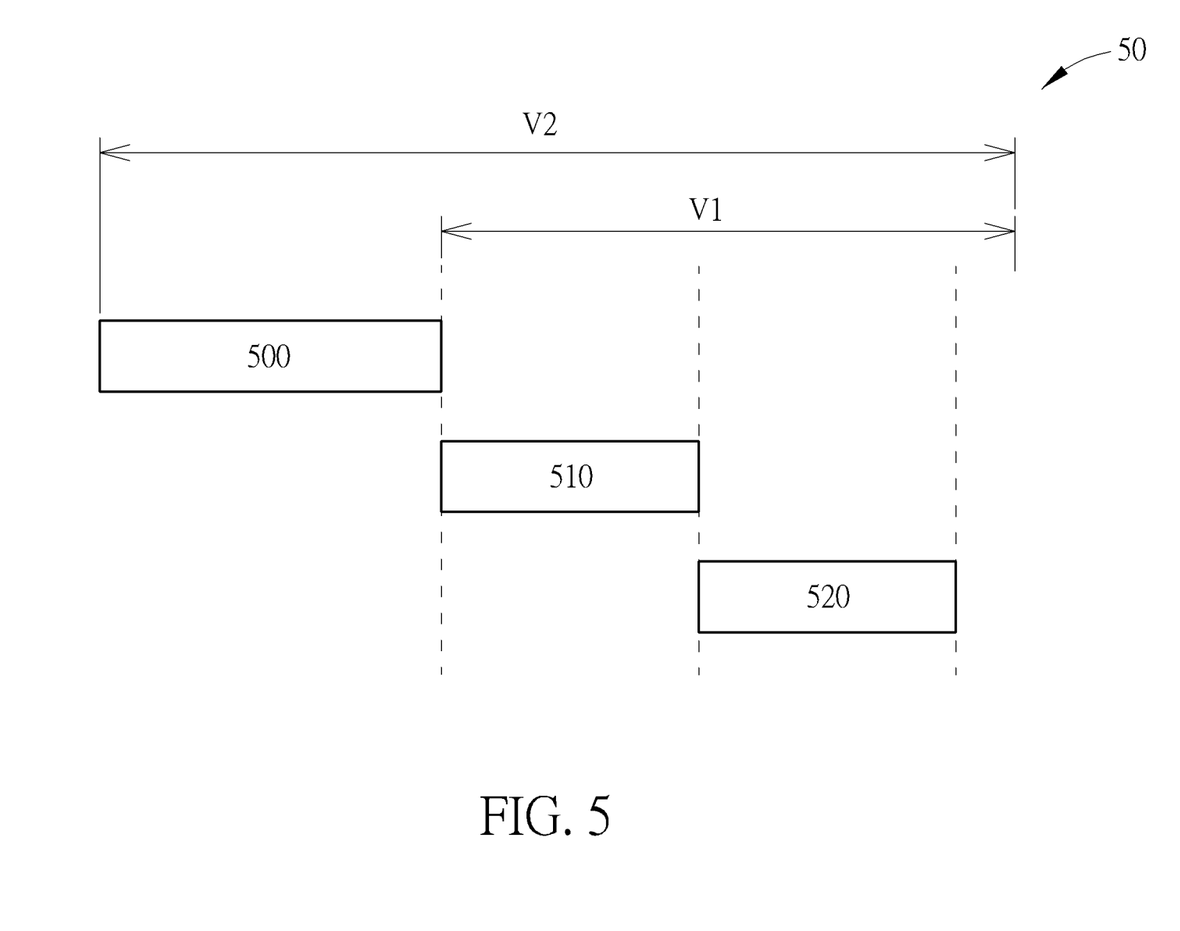
FIG. 5 is a schematic diagram illustrating uplink control information according to an embodiment of the present invention.

Specifically, a structure of the process including steps S402 to S416 is similar to that of the process 30 shown in FIG. 3, and hence the similar parts are not detailed redundantly. Unlike the process 30, the communication device 100 may transmit the first CSI subset as well as the first HARQ acknowledgment on the first PUCCH to the network node in step S412, and transmit the second CSI subset as well as the second HARQ acknowledgment on the second PUCCH to the network node in step S414. Consequently, before transmitting the first HARQ acknowledgment and the first CSI subset over the first PUCCH in step S412, the communication device 100 not only ranks the CSI reports in the first CSI set but also checks the total bit length of the CSI reports and the first HARQ acknowledgment. Moreover, the CSI reports in the first CSI set are ranked when the total bit length of the first CSI set and the first HARQ acknowledgement is greater than the first maximum payload size of the first PUCCH format. FIG. 5 is a schematic diagram illustrating uplink control information 50 according to an embodiment of the present invention. The uplink control information 50 includes a HARQ acknowledgment 500, channel status information units 510 and 520. It is worth noting that the CSI reports 403a and 403b in FIG. 4 may serve as the channel status information units 510 and 520 in FIG. 5, but the present invention is not limited thereto. Besides, either the first HARQ acknowledgment or the second HARQ acknowledgment may serve as the HARQ acknowledgment 500, and the first predetermined value may serve as the first predetermined value V1. When the CSI reports 403a and 403b are scheduled to be transmitted at the time instant T3, the communication device 100 in step S408 first ranks the CSI reports 403a and 403b. The communication device 100 also checks the total bit length of the CSI reports 403a, 403b and the first HARQ acknowledgment. In step S410, the communication device 100 then compares the total bit length of the CSI reports 403a (i.e., the channel status information unit 510), the CSI reports 403b (i.e., the channel status information unit 520) and the first HARQ acknowledgment (i.e., the HARQ acknowledgment 500) with a second predetermined value V2. This second predetermined value V2 may be the maximum payload size allowable for UCI transmission, i.e., the first maximum payload size.

If the total bit length of the CSI reports 403a, 403b and the first HARQ acknowledgment is not greater than the second predetermined value V2, the communication device 100 in step S412 transmits the first HARQ acknowledgment and the first CSI subset including the CSI reports 403a, 403b to the base station 110. The third CSI subset would be an empty set. If a total bit length of the CSI report 403a and the first HARQ acknowledgment is not greater than the second predetermined value V2, and if a total bit length of the CSI reports 403a and 403b and the first HARQ acknowledgment is greater than the second predetermined value V2, the CSI report 403a constitutes the first CSI subset, and the CSI report 403b constitutes the third CSI subset. Therefore, in step S412 the communication device 100 transmits the first HARQ acknowledgment and the CSI report 403a but drop the CSI report 403b. If a total bit length of the first HARQ acknowledgment is not greater than the second predetermined value V2, and if a total bit length of the CSI report 403a and the first HARQ acknowledgment is greater than the second predetermined value V2, the CSI reports 403a and 403b constitutes the third CSI subset, and the first CSI subset would be an empty set. Because the priority of the CSI report 403a is higher than the priority of the CSI report 403b, the CSI report 403a has the highest priority in the third CSI subset and may be referred to as a third CSI report. Therefore, in step S412 the communication device 100 drops the CSI reports 403a and 403b and merely transmits the first HARQ acknowledgment.

The first HARQ acknowledgment may be compressed to reduce the total bit length. It is worth noting that the compression of the first HARQ acknowledgment includes spatial domain bundling and/or time domain bundling by using logical AND operation. Moreover, the spatial domain bundling or time domain bundling may be performed for at least one serving cell (or at least one group of serving cells) across at least one subframe. The exact determination process involving the compression of the first HARQ acknowledgment may vary. For example, in one embodiment, one or more CSI reports may be dropped in advance of compressing the size of the first HARQ acknowledgment, which may be utilized especially when the CSI report 403a and the CSI report 403b have different priorities. The CSI report 403a and the CSI report 403b provide, for instance, RI feedback and subband CQI respectively, and hence the priority of the CSI report 403a is higher than the priority of the CSI report 403b. If the total bit length of the CSI reports 403a, 403b and the first HARQ acknowledgment is greater than the second predetermined value V2, the communication device 100 first drops the CSI report 403b with the priority lower than that of the CSI report 403a and tries to transmit the first HARQ acknowledgment and the first CSI subset including the CSI report 403a to the base station 110. If the total bit length of the CSI report 403a and the first HARQ acknowledgment is still greater than the second predetermined value V2, the communication device 100 compresses the first HARQ acknowledgment and tries to transmit the compressed first HARQ acknowledgment and the first CSI subset including the CSI report 403a to the base station 110. If the total bit length of the CSI report 403a and the compressed first HARQ acknowledgment is still greater than the second predetermined value V2, the communication device 100 drops the CSI report 403a and merely transmits the compressed first HARQ acknowledgment.

In another embodiment, the size of the first HARQ acknowledgment is compressed in advance of dropping one or more CSI reports, which may be utilized especially when the CSI report 403a and the CSI report 403b have the same priority. If the total bit length of the CSI reports 403a, 403b and the first HARQ acknowledgment is greater than the second predetermined value V2, the communication device 100 first compresses the first HARQ acknowledgment and tries to transmit the compressed first HARQ acknowledgment and the first CSI subset including the CSI reports 403a and 403b to the base station 110. If the total bit length of the CSI reports 403a, 403b and the compressed first HARQ acknowledgment is greater than the second predetermined value V2, the communication device 100 first drops the CSI report 403b with the priority lower than that of the CSI report 403a and tries to transmit the compressed first HARQ acknowledgment and the first CSI subset including the CSI report 403a to the base station 110. If the total bit length of the CSI report 403a and the compressed first HARQ acknowledgment is still greater than the second predetermined value V2, the communication device 100 compresses the first HARQ acknowledgment again and tries to transmit the compressed first HARQ acknowledgment and the first CSI subset including the CSI report 403a to the base station 110. If the total bit length of the CSI report 403a and the compressed first HARQ acknowledgment is still greater than the second predetermined value V2, the communication device 100 drops the CSI report 403a and merely transmits the compressed first HARQ acknowledgment.

Considering the first HARQ acknowledgment, the communication device 100 may check the total bit length of the CSI reports 403a, 403b and the first HARQ acknowledgment with the first predetermined value V1 and the second predetermined value V2. Specifically, if the total bit length of the CSI reports 403a and 403b is not greater than the first predetermined value V1 and the total bit length of the CSI reports 403a, 403b and the first HARQ acknowledgment is not greater than the second predetermined value V2, the communication device 100 transmits the first HARQ acknowledgment and the first CSI subset including the CSI reports 403a, 403b to the base station 110. The communication device 100 may compress the first HARQ acknowledgment before or after the first HARQ acknowledgment and the first CSI subset are transmitted. If the total bit length of the CSI reports 403a and 403b is not greater than the first predetermined value V1, and if the total bit length of the CSI reports 403a, 403b and the first HARQ acknowledgment is greater than the second predetermined value V2, the communication device 100 first drops the CSI reports 403b and tries to transmit the first HARQ acknowledgment and the first CSI subset including the CSI report 403a to the base station 110. The communication device 100 may also compresses the first HARQ acknowledgment before or after the CSI report 403b is dropped. If the total bit length of the CSI reports 403a is not greater than the first predetermined value V1, and if the total bit length of the CSI report 403a and the first HARQ acknowledgment is still greater than the second predetermined value V2, the communication device 100 drops the CSI report 403a, and merely transmits the first HARQ acknowledgment. The communication device 100 may also compress the first HARQ acknowledgment before or after the CSI report 403a is dropped.

As the number of CSI reports grows, the CSI reports may be scheduled to be transmitted in each uplink subframe in a similar way. For example, the CSI report 404a in FIG. 4 may serve as the channel status information unit 510 in FIG. 5, while the CSI reports 404b and 404c in FIG. 4 may serve as the channel status information unit 520 in FIG. 5. When the CSI reports 404a to 404c are scheduled to be transmitted at the time instant T4, the communication device 100 first determines the reporting type of the CSI report 404a, the reporting type of the CSI report 404b and the reporting type of the CSI report 404c. Here, the CSI report 404a provides, for instance, RI feedback, while the CSI report 404b and the CSI report 404c provide, for instance, wideband CQI. Then, the communication device 100 may rank the priorities of the CSI reports 404a to 404c substantially in descending order—that is to say, the priority of the CSI report 404a is higher than the priority of the CSI report 404b, and the priority of the CSI report 404b is higher than the priority of the CSI report 404c. Meanwhile, the communication device 100 also compares the total bit length of the first HARQ acknowledgment (i.e., the HARQ acknowledgment 500), the CSI report 404a (i.e., the channel status information unit 510), the CSI reports 404b and 404c (i.e., the channel status information unit 520) with the second predetermined value V2. If the total bit length of the channel status information units 510, 520 and the HARQ acknowledgment 500 is not greater than the second predetermined value V2, the communication device 100 transmits the first HARQ acknowledgment and the first CSI subset including the CSI reports 404a to 404c to the base station 110. In case the total bit length of the channel status information units 510, 520 and the HARQ acknowledgment 500 is too large to transmit, the size of the first HARQ acknowledgment is compressed in advance of transmitting any of the first CSI set and the first HARQ acknowledgment in one embodiment. Specifically, if the total bit length of the channel status information units 510, 520 and the HARQ acknowledgment 500 is greater than the second predetermined value V2, the communication device 100 drops the channel status information unit 520 having lower priority and tries to transmit the HARQ acknowledgment 500 and the first CSI subset including the CSI report 404a to the base station 110. In this case, both the CSI reports 404b and 404c are dropped. The communication device 100 may also compress the first HARQ acknowledgment in advance of dropping any CSI report in the rest—if the total bit length of the channel status information unit 510 and the HARQ acknowledgment 500 is still greater than the second predetermined value V2, the communication device 100 compresses the HARQ acknowledgment 500 and tries to transmit the compressed HARQ acknowledgment 500 and the first CSI subset including the CSI report 404a to the base station 110. Because the communication device 100 have not actually transmitted any of the first HARQ acknowledgment and any CSI report in the first CSI subset yet, the communication device 100 here compresses the first HARQ acknowledgment before any transmission. Namely, if the total bit length of the compressed HARQ acknowledgment 500 and the channel status information unit 510 is still greater than the second predetermined value V2, the communication device 100 drops the channel status information unit 510, and merely transmits the compressed HARQ acknowledgment 500.

In another embodiment, the size of the first HARQ acknowledgment is compressed in advance of dropping at least one CSI report in the third CSI subset. Specifically, if the total bit length of the channel status information units 510, 520 and the HARQ acknowledgment 500 is greater than the second predetermined value V2, the communication device 100 compresses the HARQ acknowledgment 500 and tries to transmit the compressed HARQ acknowledgment 500 and the first CSI subset including the CSI reports 404a to 404c to the base station 110. In other words, the communication device 100 may compress the first HARQ acknowledgment in advance of dropping the channel status information unit 510. If the total bit length of the channel status information units 510, 520 and the compressed HARQ acknowledgment 500 is still greater than the second predetermined value V2, the communication device 100 drops the channel status information unit 520, which has lower priority and includes the CSI reports 404b and 404c, and tries to transmit the compressed HARQ acknowledgment 500 and the first CSI subset including the CSI report 404a to the base station 110. Obviously, the CSI reports 404b and 404c are dropped until this stage. If the total bit length of the channel status information unit 510 and the compressed HARQ acknowledgment 500 is still greater than the second predetermined value V2, the communication device 100 compresses the compressed HARQ acknowledgment 500 again and tries to transmit the compressed HARQ acknowledgment 500 and the first CSI subset including the CSI report 404a to the base station 110. If the total bit length of the compressed HARQ acknowledgment 500 and the channel status information unit 510 is still greater than the second predetermined value V2, the communication device 100 drops the channel status information unit 510, and merely transmits the compressed HARQ acknowledgment 500.

Whether a CSI report is transmitted or dropped may depend on a specific reporting type—namely, if the CSI report belongs to a subband CSI report, the CSI report is dropped. For example, at a time instant T5, the serving cells P and S_2 of the first group G1 may have CSI reports 405a and 405b scheduled to constitute a first CSI set S1_5. The communication device 100 may determine the reporting type of the CSI report 405a and the reporting type of the CSI report 405b. If the CSI report 405b provides, for example, subband CQI, the communication device 100 transmits the CSI report 405a having higher priority but drops the CSI report 405b. If the CSI report 405b having lower priority does not belong to a subband CSI report but provides, for example, RI, the communication device 100 transmits both the CSI reports 405a and 405b. Alternatively, the communication device 100 may determine to transmit or drop a CSI report according to both the reporting type of the CSI report and whether the CSI report belongs to a subband CSI report. In such a situation, if the CSI report 405b does not belong to a subband CSI report, and if the reporting type of the CSI report 405a (which provides, for example, RI feedback) is the same as the reporting type of the CSI report 405b (which provides, for example, RI feedback), the communication device 100 transmits both the CSI reports 405a and 405b. Otherwise, the communication device 100 transmits the CSI report 405a having higher priority but drops the CSI report 405b having lower priority. Alternatively, the communication device 100 may determine to transmit or drop a CSI report according to both whether the total bit length of the first CSI set S1_5 is greater than the first predetermined value V1 or not and whether the CSI report belongs to a subband CSI report or not. In one example, the communication device 100 checks whether a CSI report belongs to a subband CSI report before the total bit length of the first CSI set S1_5 is compared with the first predetermined value V1. In another example, the communication device 100 checks whether the total bit length of the first CSI set S1_5 is greater than the first predetermined value V1 before a subband CSI report is dropped.

Considering the first HARQ acknowledgment, the communication device 100 may also check the total bit length of the CSI reports 405a, 405b and the first HARQ acknowledgment with the second predetermined value V2. In this case, the CSI reports 405a and 405b in FIG. 4 may serve as the channel status information units 510 and 520 in FIG. 5. When the CSI reports 405a and 405b are scheduled to be transmitted at the time instant T5, the communication device 100 may compare the total bit length of the CSI report 405a (i.e., the channel status information unit 510), the CSI report 405b (i.e., the channel status information unit 520) and the first HARQ acknowledgment (i.e., the HARQ acknowledgment 500) with the second predetermined value V2. If the total bit length of the CSI reports 405a, 405b and the first HARQ acknowledgment is not greater than the second predetermined value V2, and if the CSI report 405b having lower priority does not belong to a subband CSI report, the communication device 100 transmits the first HARQ acknowledgment and the first CSI subset including the CSI reports 405a, 405b to the base station 110. In one embodiment, the size of the first HARQ acknowledgment is compressed in advance of transmitting any of the first CSI subset and the first HARQ acknowledgment. In another embodiment, the size of the first HARQ acknowledgment is compressed in advance of dropping at least one CSI report in the third CSI subset. In other words, if the CSI report 405b provides subband CQI, or if the total bit length of the CSI reports 405a, 405b and the first HARQ acknowledgment is greater than the second predetermined value V2, the communication device 100 first drops the CSI report 405b and tries to transmit the first HARQ acknowledgment and the first CSI subset including the CSI report 405a to the base station 110. The communication device 100 may also compress the first HARQ acknowledgment before or after the CSI report 405b is dropped. If the total bit length of the CSI report 405a and the first HARQ acknowledgment is still greater than the second predetermined value V2, the communication device 100 drops the CSI report 405a, and merely transmits the first HARQ acknowledgment. The communication device 100 may also compress the first HARQ acknowledgment before or after the CSI report 405a is dropped.

Whether a CSI report is transmitted or dropped may depend on its dropping number, which indicates how many times the CSI report has been dropped in the past. For example, at a time instant T6, the serving cells P, S_1, S_2 and S_k may have CSI reports 406a to 406d scheduled to constitute a first CSI set S1_6, and the priorities of the CSI reports 406a to 406d are substantially ranked in descending order. Since the CSI reports 406b to 406d having lower priorities have been dropped once, twice and twice respectively, the communication device 100 determines the dropping number of the CSI report 406b to be 1, the dropping number of the CSI report 406c to be 2 and the dropping number of the CSI report 406d to be 2. There are many ways to took full advantage of the dropping number. In one example, a CSI report is able to be transmitted when its dropping number is not smaller than a threshold value. If the threshold value equals 3, then the communication device 100 transmits the CSI report 406a but drops the CSI reports 406b to 406d. The CSI report 406a is transmitted because its priority is the highest; alternatively, it is probably because the CSI report 406a is generated to inform the network node of the channel conditions of the primary serving cell P. If the threshold value equals 2, then the communication device 100 transmits the CSI reports 406a, 406c, 406d, but drops the CSI report 406b with the dropping number smaller than the threshold value. The number of CSI reports in the first CSI subset may not be larger than the predetermined number configured by the network node as mentioned above. Consequently, in the case that the threshold value equals 2 and that the predetermined number equals 2, the communication device 100 first selects the CSI reports 406c and 406d as primitive candidates from the CSI reports 406b to 406d since their dropping numbers are not smaller than the threshold value. However, the CSI report 406c provides wideband CQI, while the CSI report 406d provides subband CQI. Therefore, the communication device 100 then selects the CSI report 406c as an ultimate candidate from the CSI reports 406c and 406d, and transmits the CSI reports 406a, 406c but drops the CSI reports 406b, 406d. Alternatively, in the case that the threshold value equals 2 and that the predetermined number equals 2, the communication device 100 selects the CSI report 406b as a primitive candidate from the CSI reports 406b to 406d because the CSI report 406b provides wideband CQI, and because both the CSI reports 406c and 406d provide subband CQI. Nevertheless, the communication device 100 cannot select the CSI report 406b as an ultimate candidate since its dropping number is smaller than the threshold value. In such a situation, the communication device 100 transmits the CSI report 406a but drops the CSI reports 406b to 406d. Namely, a CSI report with a dropping number smaller than the threshold value is dropped in advance of another CSI report with a dropping number greater than the threshold value or the CSI report corresponding to the primary serving cell P.

Considering the first HARQ acknowledgment, the communication device 100 may also check the total bit length of the CSI report 406a, the ultimate candidate (e.g., the CSI report 406c) and the first HARQ acknowledgment with the second predetermined value V2. In this case, the CSI reports 406a and 406c in FIG. 4 may serve as the channel status information units 510 and 520 in FIG. 5. When the CSI reports 406a to 406d are scheduled to be transmitted at the time instant T6, the communication device 100 selects the CSI report 406c with the dropping number equal to 2 as the ultimate candidate from the CSI reports 406b to 406d according to their dropping numbers, priorities or reporting types. Meanwhile, the communication device 100 also compares the total bit length of the CSI report 406a (i.e., the channel status information unit 510), the CSI report 406c (i.e., the channel status information unit 520) and the first HARQ acknowledgment (i.e., the HARQ acknowledgment 500) with the second predetermined value V2. In one embodiment, the size of the first HARQ acknowledgment is compressed in advance of transmitting any of the first CSI subset and the first HARQ acknowledgment, which may be utilized especially when the dropping number of the CSI report 406c is smaller than the threshold value. Take the threshold value equal to 3 as an example. If the total bit length of the CSI reports 406a, 406c and the first HARQ acknowledgment is greater than the second predetermined value V2, the communication device 100 first drops the CSI report 406c and tries to transmit the first HARQ acknowledgment and the first CSI subset including the CSI report 406a to the base station 110 because the dropping number of the CSI report 406c is smaller than the threshold value. If the total bit length of the CSI report 406a and the first HARQ acknowledgment is still greater than the second predetermined value V2, the communication device 100 compresses the first HARQ acknowledgment and tries to transmit the compressed first HARQ acknowledgment and the first CSI subset including the CSI report 406a to the base station 110. If the total bit length of the CSI report 406a and the compressed first HARQ acknowledgment is still greater than the second predetermined value V2, the communication device 100 drops the CSI report 406a and merely transmits the compressed first HARQ acknowledgment.

In another embodiment, the size of the first HARQ acknowledgment is compressed in advance of dropping at least one CSI report in the third CSI subset, which may be utilized especially when the CSI report 406c is greater than the threshold value. Take the threshold value equal to 1 as an example. If the total bit length of the CSI reports 406a, 406c and the first HARQ acknowledgment is greater than the second predetermined value V2, the communication device 100 first compresses the first HARQ acknowledgment and tries to transmit the compressed first HARQ acknowledgment and the first CSI subset including the CSI reports 406a and 406c to the base station 110 because the dropping number of the CSI reports 406c is greater than the threshold value. If the total bit length of the CSI reports 406a, 406c and the compressed first HARQ acknowledgment is greater than the second predetermined value V2, the communication device 100 first drops the CSI report 406c, and tries to transmit the first HARQ acknowledgment and the first CSI subset including the CSI report 406a to the base station 110. If the total bit length of the CSI report 406a and the compressed first HARQ acknowledgment is still greater than the second predetermined value V2, the communication device 100 compresses the first HARQ acknowledgment again and tries to transmit the compressed first HARQ acknowledgment and the first CSI subset including the CSI report 406a to the base station 110. If the total bit length of the CSI report 406a and the compressed first HARQ acknowledgment is still greater than the second predetermined value V2, the communication device 100 drops the CSI report 406a and merely transmits the compressed first HARQ acknowledgment.

Whether a CSI report is transmitted or dropped may depend on its dropping number, and a CSI report is able to be transmitted when it has the largest dropping number. Again, the first CSI set S1_6 including CSI reports 406a to 406d are scheduled to be transmitted at the time instant T6. Since the CSI reports 406b to 406d have been dropped once, twice and twice respectively, the communication device 100 determines the dropping number of the CSI report 406b to be 1, the dropping number of the CSI report 406c to be 2 and the dropping number of the CSI report 406d to be 2. In this case, the communication device 100 first selects the CSI reports 406c and 406d as primitive candidates from the CSI reports 406b to 406d since their dropping numbers are larger than the dropping number of the CSI report 406b. However, the CSI report 406c provides wideband CQI, while the CSI report 406d provides subband CQI. Because the number of CSI reports in the first CSI subset may not be larger than the predetermined number configured by the network node as mentioned above, the communication device 100 then selects the CSI report 406c as an ultimate candidate from the CSI reports 406c and 406d, and transmits the CSI report 406a, 406c but drops the CSI reports 406b, 406d. Alternatively, the communication device 100 selects the CSI reports 406b and 406c as primitive candidates from the CSI reports 406b to 406d because both the CSI reports 406b and 406c provide wideband CQI, and because the CSI report 406d provides subband CQI. However, the dropping number of the CSI report 406c is larger than that of the CSI report 406b. Therefore, the communication device 100 selects the CSI report 406c as an ultimate candidate from the CSI reports 406b and 406c, and transmits the CSI reports 406a, 406c but drops the CSI reports 406b, 406d. Namely, a CSI report with a smaller dropping number is dropped in advance of another CSI report with a greater dropping number or the CSI report corresponding to the primary serving cell P. Alternatively, the communication device 100 may determine to transmit or drop a CSI report according to both its dropping number and whether the total bit length of the first CSI set S1_6 is greater than the first predetermined value V1. In one example, the communication device 100 checks the dropping number of a CSI report before the total bit length of the first CSI set S1_6 is compared with the first predetermined value V1. In another example, the communication device 100 checks whether the total bit length of the first CSI set S1_6 is greater than the first predetermined value V1 before a CSI report having unfit dropping number is dropped.

Whether a CSI report is transmitted or dropped may depend on its reporting type, and the CSI report, which has the same reporting type as that of the CSI report corresponding to the primary serving cell P, may be transmitted even though its priorities is low. For example, at a time instant T7, the serving cells P and S_k may have CSI reports 407a and 407b scheduled to constitute a first CSI set S1_7, and the CSI reports 407a and 407b in FIG. 4 may serve as the channel status information units 510 and 520 in FIG. 5. When the CSI reports 407a and 407b are scheduled to be transmitted at the time instant T7, the communication device 100 may rank the priority of the CSI report 407a higher than the priority of the CSI report 407b. The communication device 100 may determine the reporting type of the CSI report 407a and the reporting type of the CSI report 407b. If the CSI report 407b provides, for example, subband CQI and/or PMI while the CSI report 407a provides, for example, RI feedback, the communication device 100 transmits the CSI report 407a having higher priority but drops the CSI report 407b. If both the CSI reports 407a and 407b provide, for example, subband CQI, the communication device 100 transmits both the CSI reports 407a and 407b although the CSI report 407b has the priority lower than the CSI report 407a. Alternatively, the communication device 100 may determine to transmit or drop a CSI report according to both the reporting types and whether the total bit length of the first CSI set S1_7 is greater than the first predetermined value V1. In one example, the communication device 100 checks the reporting type of a CSI report before the total bit length of the first CSI set S1_7 is compared with the first predetermined value V1. In another example, the communication device 100 checks whether the total bit length of the first CSI set S1_7 is greater than the first predetermined value V1 before the CSI report, which has the reporting type different from that of the CSI report corresponding to the primary serving cell P, is dropped.

Please note that the CSI reports 401a to 407b are exemplary embodiments of the invention, and those skilled in the art can make alternations and modifications accordingly. For example, the exact number of CSI reports scheduled to be transmitted at a time instant may alter, and the reporting types of the CSI reports may be modified according to different system requirements. Moreover, the rule to determine whether a CSI reports is transmitted or dropped may be identical and fixed through all of the time instants T1 to T7 and may be configured by the network node or the communication device 100. However, the present invention is not limited thereto, and the rules to determine whether a CSI reports is transmitted or dropped at the time instants T1 to T7 may be changed periodically or by an instruction.

In the prior art, there is only one single PUCCH on a primary CC, and only one CSI reports can be transmitted over the PUCCH. However, as 3GPP approves to extend CA up to 32 CCs in Rel-13 standard, there could be more than one CSI reports scheduled to be transmitted. This requires a considerably large payload, which the current PUCCH format with a fixed and limited payload size cannot satisfy.

By comparison, multiple CSI reports can be transmitted on a first PUCCH with a first PUCCH format and/or a second PUCCH with a second PUCCH format to the base station 110 in the present invention. And the final number of the multiple CSI reports to be transmitted is determined by the communication device according to their reporting types, their dropping numbers and/or their total bit length. The first PUCCH and the second PUCCH are associated with the serving cells of the first group and the serving cells of the second group respectively. Moreover, to support larger payload, the first PUCCH format, which may be the same as or different from the second PUCCH format, may be a PUCCH format X with a configurable maximum payload size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of uplink control information (UCI) transmission for a user equipment in a communication system, the method comprising:
   receiving a first physical uplink control channel (PUCCH) configuration comprising a first maximum payload size and a first PUCCH format;
   ranking channel status information (CSI) reports in a first CSI set corresponding to a first group of serving cells according to at least one of reporting types, CSI process identifiers (ID), serving cell indexes, and CSI subframe sets, wherein the first CSI set comprises the first CSI subset to be transmitted at a time instant and a third CSI subset to be dropped, and at least one priority of at least one CSI report in the third CSI subset is lower than at least one priority of at least one CSI report in the first CSI subset; and
   transmitting the first CSI subset comprising a number of CSI reports for the first group of serving cells on a first PUCCH with the first PUCCH format to a network node.

2. The method of claim 1, wherein the number of CSI reports in the first CSI subset is not larger than a predetermined number.

3. The method of claim 1, wherein the number of CSI reports in the first CSI subset is able to be larger than 1.

4. The method of claim 1, further comprising:
   receiving a second PUCCH configuration comprising a second maximum payload size and a second PUCCH format; and
   transmitting a second CSI subset comprising a number of CSI reports for a second group of serving cells on a second PUCCH with the second PUCCH format to the network node.

5. The method of claim 4, wherein the second PUCCH format is a PUCCH format 2, a PUCCH format 2a, a PUCCH format 2b, a PUCCH format 3 specified in Long Term Evolution (LTE) or a PUCCH format X with a configurable maximum payload size, the first PUCCH format is the PUCCH format X or a PUCCH format Y, and X and Y are positive integers.

6. The method of claim 1, wherein the step of transmitting the first CSI subset on the first PUCCH with the first PUCCH format to the network node comprises:
   transmitting the first CSI subset to the network node and dropping a third CSI subset when a total bit length of the first CSI subset is not greater than a first predetermined value and when a total bit length of the first CSI subset and a third CSI report in the third CSI subset is greater than the first predetermined value,
   wherein the third CSI report has a highest priority in the third CSI subset.

7. The method of claim 6, wherein the first predetermined value is the first maximum payload size of the first PUCCH format.

8. The method of claim 1, wherein the step of transmitting the first CSI subset on the first PUCCH with the first PUCCH format to the network node comprises:
   transmitting the first CSI subset and a first hybrid automatic repeat request (HARQ) acknowledgment on the first PUCCH with the first PUCCH format to the network node and dropping a third CSI subset when a total bit length of the first HARQ acknowledgment and the first CSI subset is not greater than the first maximum payload size and when a total bit length of the first HARQ acknowledgment, the first CSI subset and a third CSI report in the third CSI subset is greater than the first maximum payload size,
   wherein the third CSI report has a highest priority in the third CSI subset.

9. The method of claim 8, wherein the step of transmitting the first CSI subset on the first PUCCH with the first PUCCH format to the network node further comprises:
   compressing a size of the first HARQ acknowledgment in advance of dropping at least one CSI report in the third CSI subset; or
   compressing the size of the first HARQ acknowledgment in advance of transmitting the first CSI subset or the first HARQ acknowledgment, wherein a spatial domain bundling or a time domain bundling is applied to at least one serving cell in the first group in order to compress the first HARQ acknowledgment.

10. The method of claim 8, wherein the first CSI subset is an empty set when all CSI reports in the first CSI set is dropped.

11. The method of claim 1, wherein a second CSI report with a second priority in the first CSI set is dropped in advance of a first CSI report with a first priority in the first CSI set, and the second priority is lower than the first priority.

12. The method of claim 1, wherein the step of transmitting the first CSI subset on the first PUCCH with the first PUCCH format to the network node comprises:
at least one CSI report in the third CSI subset is dropped when the at least one CSI report belongs to a subband CSI report; or
a second CSI report with a second dropping number in the first CSI set is dropped in advance of a first CSI report with a first dropping number in the first CSI set when the second dropping number is smaller than the first dropping number or a threshold value.

13. A communication device, comprising:
a storage unit, configured to store a program code; and
a processing unit, coupled to the storage unit and configured to execute the program code, wherein a method of uplink control information (UCI) transmission compiled into the program code comprises:
receiving a first physical uplink control channel (PUCCH) configuration comprising a first maximum payload size and a first PUCCH format;
ranking channel status information (CSI) reports in a first CSI set corresponding to a first group of serving cells according to at least one of reporting types, CSI process identifiers (ID), serving cell indexes, and CSI subframe sets, wherein the first CSI set comprises the first CSI subset to be transmitted at a time instant and a third CSI subset to be dropped, and at least one priority of at least one CSI report in the third CSI subset is lower than at least one priority of at least one CSI report in the first CSI subset; and
transmitting the first CSI subset comprising a number of CSI reports for the first group of serving cells on a first PUCCH with the first PUCCH format to a network node.

14. The communication device of claim 13, wherein the number of CSI reports in the first CSI subset is not larger than a predetermined number.

15. The communication device of claim 13, wherein the number of CSI reports in the first CSI subset is able to be larger than 1.

16. The communication device of claim 13, wherein the method further comprises:
receiving a second PUCCH configuration comprising a second maximum payload size and a second PUCCH format; and
transmitting a second CSI subset comprising a number of CSI reports for a second group of serving cells on a second PUCCH with the second PUCCH format to the network node.

17. The communication device of claim 16, wherein the second PUCCH format is a PUCCH format 2, a PUCCH format 2a, a PUCCH format 2b, a PUCCH format 3 specified in Long Term Evolution (LTE) or a PUCCH format X with a configurable maximum payload size, the first PUCCH format is the PUCCH format X or a PUCCH format Y, and X and Y are positive integers.

18. The communication device of claim 13, wherein the step of transmitting the first CSI subset on the first PUCCH with the first PUCCH format to the network node comprises:
transmitting the first CSI subset to the network node and dropping a third CSI subset when a total bit length of the first CSI subset is not greater than a first predetermined value and when a total bit length of the first CSI subset and a third CSI report in the third CSI subset is greater than the first predetermined value,
wherein the third CSI report has a highest priority in the third CSI subset.

19. The communication device of claim 18, wherein the first predetermined value is the first maximum payload size of the first PUCCH format.

20. The communication device of claim 13, wherein the step of transmitting the first CSI subset on the first PUCCH with the first PUCCH format to the network node comprises:
transmitting the first CSI subset and a first hybrid automatic repeat request (HARQ) acknowledgment on the first PUCCH with the first PUCCH format to the network node and dropping a third CSI subset when a total bit length of the first HARQ acknowledgment and the first CSI subset is not greater than the first maximum payload size and when a total bit length of the first HARQ acknowledgment, the first CSI subset and a third CSI report in the third CSI subset is greater than the first maximum payload size,
wherein the third CSI report has a highest priority in the third CSI subset.

21. The communication device of claim 20, wherein the step of transmitting the first CSI subset on the first PUCCH with the first PUCCH format to the network node further comprises:
compressing a size of the first HARQ acknowledgment in advance of dropping at least one CSI report in the third CSI subset; or
compressing the size of the first HARQ acknowledgment in advance of transmitting the first CSI subset or the first HARQ acknowledgment,
wherein a spatial domain bundling or a time domain bundling is applied to at least one serving cell in the first group in order to compress the first HARQ acknowledgment.

22. The communication device of claim 20, wherein the first CSI subset is an empty set when all CSI reports in the first CSI set is dropped.

23. The communication device of claim 13, wherein a second CSI report with a second priority in the first CSI set is dropped in advance of a first CSI report with a first priority in the first CSI set, and the second priority is lower than the first priority.

24. The communication device of claim 13, wherein the step of transmitting the first CSI subset on the first PUCCH with the first PUCCH format to the network node comprises:
at least one CSI report in the third CSI subset is dropped when the at least one CSI report belongs to a subband CSI report; or
a second CSI report with a second dropping number in the first CSI set is dropped in advance of a first CSI report with a first dropping number in the first CSI set when the second dropping number is smaller than the first dropping number or a threshold value.

25. A method of uplink control information (UCI) transmission for a user equipment in a communication system, the method comprising:

transmitting a first CSI subset, a first hybrid automatic repeat request (HARQ) acknowledgment, and at least one third CSI report in a third CSI subset on a first physical uplink control channel (PUCCH) with a first PUCCH format to a network node of the communication system when a total bit length of the first HARQ acknowledgment, the first CSI subset and the at least one third CSI report in the third CSI subset is not greater than a first maximum payload size, wherein the first PUCCH format and the first maximum payload size are determined according to a PUCCH configuration transmitted by the network node.

26. The method of claim 25, wherein the at least one third CSI report has a highest priority in the third CSI subset.

27. The method of claim 25, wherein at least one remaining report of the third CSI subset is not transmitted when a total bit length of the first HARQ acknowledgment, the first CSI subset, at least one third CSI report and at least one remaining report of the third CSI subset is greater than the first maximum payload size.

28. The method of claim 25, wherein at least one third CSI report of the third CSI subset is dropped in a prioritized order until a total bit length of the first HARQ acknowledgment, the first CSI subset, a remaining part of the third CSI subset is not greater than the first maximum payload size.

* * * * *